United States Patent [19]

Daubenbüchel et al.

[11] Patent Number: 4,874,649

[45] Date of Patent: Oct. 17, 1989

[54] PROCESS FOR PRODUCING HOLLOW BODIES OF THERMOPLASTIC MATERIAL

[75] Inventors: Werner Daubenbüchel, Bergisch-Gladbach; Alfred Jira, Königswinter, both of Fed. Rep. of Germany

[73] Assignee: Krupp Kautex Maschinenbau GmbH., Fed. Rep. of Germany

[21] Appl. No.: 154,677

[22] Filed: Feb. 10, 1988

[30] Foreign Application Priority Data

Mar. 12, 1987 [DE] Fed. Rep. of Germany ....... 3708006

[51] Int. Cl.⁴ .................. B32B 5/20; B29C 67/22; B29C 49/22; B29C 49/04
[52] U.S. Cl. ..................... 428/36.5; 264/46.1; 264/46.4; 264/321; 264/515; 264/524; 264/DIG. 1; 425/523; 425/532; 425/817 R
[58] Field of Search ............ 264/46.1, DIG. 1, 45.1, 264/46.4, 321, 515, 524; 425/523, 532, 817 R; 428/36.5

[56] References Cited

U.S. PATENT DOCUMENTS

| | | | |
|---|---|---|---|
| 3,168,207 | 2/1965 | Noland et al. | 215/1 |
| 3,225,127 | 12/1965 | Scott, Jr. | 264/54 |
| 3,901,958 | 8/1975 | Doll | 264/46.1 X |
| 4,115,491 | 9/1978 | Hanning | 264/DIG. 1 |
| 4,120,924 | 10/1978 | Rainville | 264/45.5 |
| 4,150,080 | 4/1979 | Hagen | 264/523 |
| 4,233,009 | 11/1980 | Hagen | 425/142 |

FOREIGN PATENT DOCUMENTS

| | | |
|---|---|---|
| 0071938 | 2/1983 | European Pat. Off. . |
| 1218708 | 6/1966 | Fed. Rep. of Germany . |
| 1218708 | 4/1974 | Fed. Rep. of Germany . |
| 2259523 | 6/1974 | Fed. Rep. of Germany . |
| 2618071 | 1/1977 | Fed. Rep. of Germany . |

Primary Examiner—Philip Anderson
Attorney, Agent, or Firm—Panitch, Schwarze, Jacobs and Nadel

[57] ABSTRACT

In a process for producing a hollow body with a wall which partially comprises foamed thermoplastic material by an extrusion blow molding procedure, a preform which comprises at least first and second layers of which at least one comprises foamable plastics material is first extruded, the layer of foamable material is foamed, and then the preform is expanded in a blow molding mold by the application of an internal pressure. The hollow body may have a welded seam at a region of the hollow body at which an operation of squeezing off excess material has been carried out, the seam being in the form of an outwardly projecting flange web portion and the thickness thereof being such that the layer of foamable material is compressed at least to such an extent that it is not thicker than in the unfoamed condition.

25 Claims, 5 Drawing Sheets

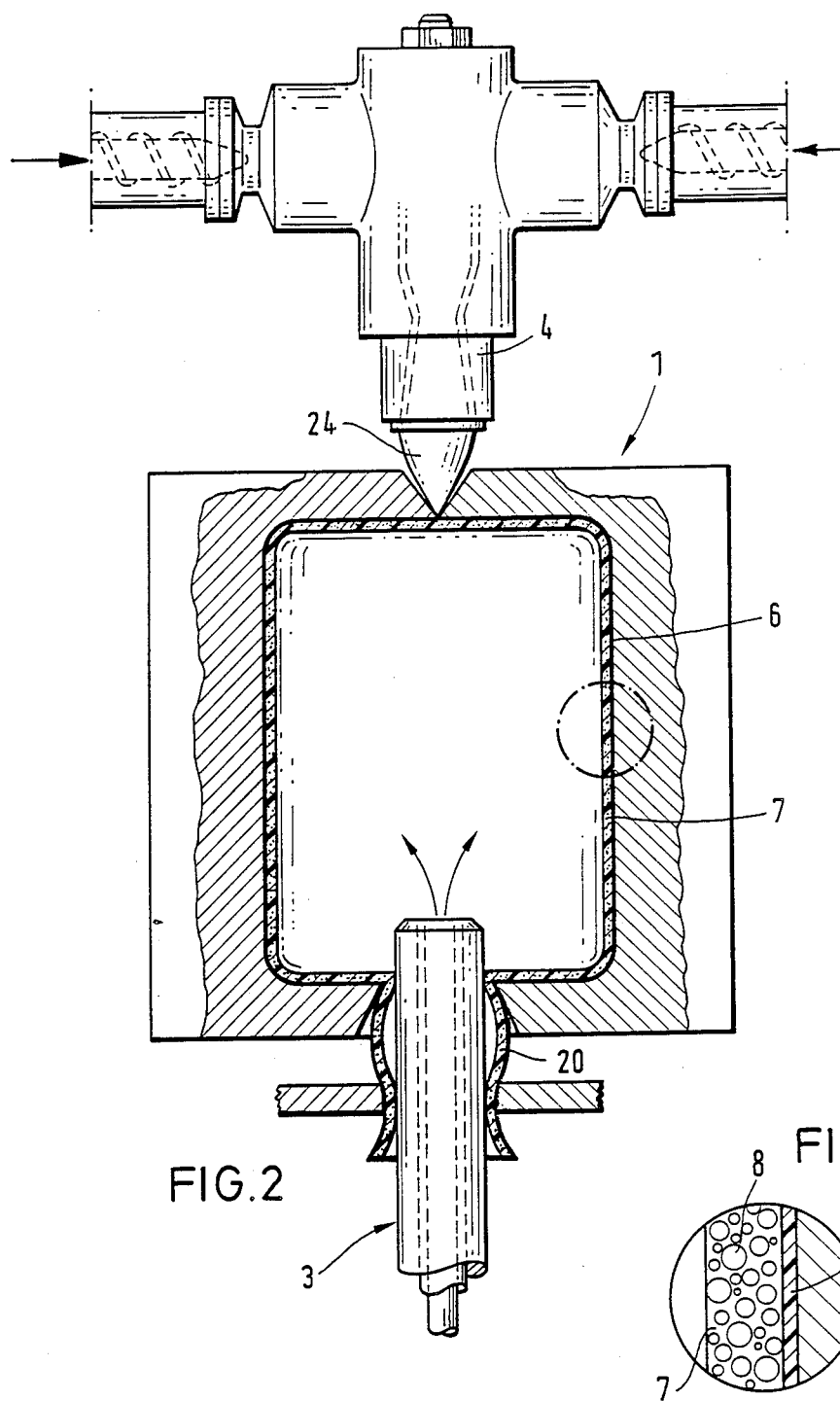

PROCESS FOR PRODUCING HOLLOW BODIES OF THERMOPLASTIC MATERIAL

BACKGROUND OF THE INVENTION

The present invention relates generally to a process for the production of hollow bodies from thermoplastic material and more particular such hollow bodies whose wall at least partially comprises foamed thermoplastic material of a multi-layer structure, by an extrusion blowing procedure.

In one form of process for producing hollow bodies with a multi-layer or laminate wall structure, as disclosed for example in U.S. patent specification No. 3 901 958, a preform comprising foamable material is extruded into a cavity which is under an increased pressure above atmospheric pressure, such that foaming of the layer of foamable material of the preform is substantially hindered. A blow molding mold is also disposed within the above-mentioned cavity, and the preform is expanded within the blowing mold in a non-foamed condition. Thereupon the pressure in the cavity accommodating the hollow molded article and in the hollow body itself is reduced to a level which permits foaming of the layer consisting of foamable material.

One of the aspects on which that process is based is that it is not possible, or is possible only at the expense of major difficulties, to expand a preform which has already been foamed up. Those difficulties are essentially to be attributed to the point that the foamed material of a preform which is still in a thermoplastic condition has regions which exhibit different strength and expandability values, over the length and periphery of the preform. The result of that is that weak points are formed under the effect of the internal pressure within the preform, in the wall of the preform or the hollow molded article which is to be produced therefrom. In many circumstances such weak points cause the wall of the preform or the molded article produced therefrom to tear open, giving rise to wastage. The above-indicated previous process takes account of that fact, but at the expense of incurring serious disadvantages in terms of operating procedure and the equipment involved. Thus, maintaining an increased pressure in the above-mentioned cavity in order to prevent the foamable material from foaming and expanding in the first phase of the production operation complicates the operating procedure involved. A similar point arises in regard to restoring the increased pressure in the cavity, before beginning the next working cycle in the process. In addition, a high level of apparatus expenditure is required in that connection, in particular for the purposes of delimiting relative to the atmosphere the above-mentioned cavity which accommodates the blowing mold and the associated components thereof and which makes it possible to build up the increased pressure required. Furthermore, the fact that the wall of the preform comes into contact with the wall of the mold prior to the beginning of the foaming process necessarily results in the material suffering from a cooling effect, which can have an adverse effect on the foaming process, that is to say, the foam cannot be formed unimpededly and with total freedom to expand. Finally, the above-described process does not take account of the fact that hollow bodies which are produced by an extrusion blowing procedure are provided with welded seams, the production of which may require special precautionary steps to be taken, by virtue of the presence of layers of foamed material in the hollow body.

The above-described process also provides for producing and expanding a two-layer preform in which the outer layer comprises non-foamable thermoplastic material. However that layer serves exclusively for decorative purposes and makes no contribution to structural integrity of the molded article.

SUMMARY OF THE INVENTION

An object of the present invention is to provide a process for producing a hollow body by extrusion blow molding, which does not seriously suffer from disadvantages of the above-described prior processes.

Another object of the present invention is to provide a process for the production of a hollow body by extrusion blow molding, using a procedure which at least substantially corresponds to the normal procedure involved in the extrusion blow molding of preforms of non-foamable material.

Yet another object of the present invention is to provide a process for the production of a hollow body whose wall comprises at least in part foamed thermoplastic material by extrusion blow molding, which can be carried out in a substantially more reliable and rational fashion than previous processes, without involving major modifications in the operating equipment employed for performing the working operations of the process.

Still a further object of the present invention is to produce a hollow body whose wall partially comprises foamed plastic material, with a satisfactory welded seam, using equipment which corresponds to the usual equipment employed for co-extrusion blow molding.

In accordance with the present invention these and other objects are achieved by a process for producing a hollow body having a wall partially comprising foamed thermoplastic material by an extrusion blowing procedure. A preferably tubular preform or blank including at least first and second layers of which at least one layer comprises foamable plastic material is extruded and thereupon firstly the one or more layers of foamable material is foamed and a blowing mold is closed around the preform. The preform is expanded in the blowing mold until it bears against the inside mold cavity surface, using an internal increased pressure therein, which is such that the at least one foamed layer is compressed only to an immaterial degree or even substantially not at all.

The invention is based on the realisation that the use of at least one layer of non-foamable thermoplastic material, even when using a thickness which is small in comparison with the layer of foamable material, makes it possible for the preform with the at least one layer consisting of foamable material to be expanded in a condition in which that material has already been foamed, without giving rise to the danger of forming weak points or even holes through the wall of the article. That is the case even when the bubbles in the foam material of the foamed layer are very large and the foamed layer is possibly even of an open-cell configuration. The layer of non-foamable material may be so thin that is could scarcely be satisfactorily extruded, on its own.

It should be noted at this stage that the procedure involved in the process in accordance with the invention is such that the individual working operations which are performed in succession in that procedure take place in the usual manner in relation to extrusion blow molding. There is no need to provide any special operations or items of equipment for delaying the foaming process and thus holding it in check. On the contrary the foaming of the layer(s) consisting of foamable material begins immediately after the material passes through the outlet opening of the extrusion head, as the thermoplastic material leaves the extrusion head and is thus relieved of pressure. The latter effect is one which occurs automatically as the material comes out of the outlet opening of the extrusion head, having regard to the high pressure obtaining within the extrusion head. That effect occurs in any case in an extrusion process and is utilised by the invention for triggering off the foaming process.

Depending on the purpose of the end product which is to be produced from the preform, the layer of non-foamable material may be arranged on the outside, thus giving an article which is provided on its outside with a smooth surface while on its inside it has a layer which is foamed to a greater or lesser degree, depending on the foaming procedure. That form of structure is advantageous in particular in regard to tubular ducts or passages which are used for example in the automobile industry, for carrying air required for example for ventilating the passenger compartment of a vehicle. Such ducts may be responsible for conducting sound for example from the area of the engine compartment into the interior of the vehicle. Now, the noise level which is produced as a result in the interior of the vehicle can be considerably reduced if the ducts consist of hollow bodies of the above-indicated kind which are produced by the process in accordance with the invention, as the inner foamed and therefore porous layer which has normally open pores at its inward surface has a sound-damping effect.

Alternatively however the layer of foamable material may be disposed on the outside of the molded article produced, with the layer of non-foamable material therefore forming an internal layer. That structure may be advantageous for example when hollow bodies of that kind are used to produce ducts or conduits for carrying a flow of liquid or gas with dust or other particles therein. As will be readily appreciated, if the inner layer defining the internal wall surface of such a duct were to consist of foamed material, that material could interfere with the flow of the liquid or gas through the duct, for example particles could be deposited in open pores at the surface of the foamed material. That situation therefore requires the duct to have a smooth internal surface, in combination with a foamed outer layer thereon, to provide a sound-damping and heat-insulating effect. The outer layer of foamed material can also serve substantially to reduce noise which may be produced by that layer coming into contact with other parts of a motor vehicle, for example electric wires or cable looms.

If the finished product is subject to particularly high levels of requirement in regard to internal and external sound damping, it is possible in one embodiment of the invention to provide two foamed layers on the hollow body produced by the process of the invention, with a non-foamed layer between the two foamed layers.

In situations of use which require smooth inner and outer surfaces but in which the sound-damping and heat-insulating effect of a layer of foam material is also particularly important, the layer of foam material may be arranged in the middle between the two layers of non-foamed material. With such a structure, it may be advantageous for the inner layer of non-foamed material to be thinner and possibly very much thinner than the outer layer of non-foamed material.

In another embodiment of the process in accordance with the invention, in a hollow body produced thereby, a layer of plastic material mixed with inorganic filler material may be disposed between outer and inner layers, the outer layer for example comprising non-foamable material and the inner layer comprising foamable material, although further modifications in that respect may be envisaged. The middle layer may comprise for example a glass fiber reinforced plastic material. That structure may be important if for example particularly high levels of requirement are made in respect of the mechanical properties of an article produced in that fashion. The acoustic damping properties of such an article may also be enhanced by the use of high-density filler material in the middle layer.

All the layers constituting the preform and the hollow body produced therefrom may consist of the same material, differing from each other only in that the foamable layer includes a foaming agent added to the material thereof. It will be appreciated however that it is also possible to use different materials for the respective layers.

In another embodiment of the process in accordance with the invention the individual layers of the article may be welded together or they may be joined together for example by a bonding or adhesive agent. The latter form of structure is required when the individual layers comprise a material or materials which cannot be welded together so that the individual layers are not satisfactorily joined together during the actual extrusion operation.

In the production of hollow bodies in accordance with the process of the present invention, the layers of material forming the preform may already be joined together in the region of the extrusion head as otherwise it is possible that the one or more layers of non-foamable material, for reasons related to the extrusion procedure, could not be kept as thin as may possibly be desired.

The increased internal pressure which is used to expand the pre-foamed preform in the blowing mold is preferably to be such that the bubbles or pores in the foamed material are not compressed or are at least not compressed to a substantial degree. The level of the pressure to be applied will be markedly lower than in the case of a conventional extrusion blowing process in which the pressure may be between 5 and 10 bars. In the case of the process in accordance with the present invention, the increased pressure required for expanding the preform may be for example of the order of magnitude of 1 bar and possibly even less than around 0.5 bar.

An aspect of an extrusion blowing process, which is of considerable significance in many circumstances, is that the generally tubular preform contains more material than is required to produced the finished hollow body. Therefore those regions of the preform which are not required for molding of the hollow body in the blow molding mold represent excess material which is squeezed off the preform when the multi-part blow molding mold is closed therearound. For that purpose, the mold is provided with portions, referred to hereinafter as squeeze edges, for squeezing excess material off the preform in the mold cavity. Such squeeze edges also perform the function of simultaneously closing the preform and therewith the hollow article to be produced therefrom, at the respective locations at which excess material has been squeezed off the preform. That closure effect is produced by a welding procedure which causes the mutually oppositely disposed portions of the preform to be bonded together. The quality of those weld joins is crucial in regard to the quality of the hollow body produced by the process of the invention as the usefulness thereof generally depends on the welded seams being capable of meeting all the loadings and stresses to which the molded article is subjected in the course of its regular use. The man skilled in this art will be aware of the problems involved in squeezing off excess material and simultaneously forming a welded seam in that region, reference being made in that respect for example to U.S patent specifications Nos. 4 150 080 and 4 233 009. Now, the process in accordance with the present invention also suffers from the further complicating factor that, with the pressure required for the formation of the welded seam or seams, the foamed layer or layers in the hollow body produced by the present process yield to a greater extent than in the case of non-foamed layers and even yield to a certain extent elastically, thus making it difficult to produce the pressure required for forming the welded seam.

The formation of a welded seam is also a matter of considerable significance when excess material is squeezed off a generally tubular preform not just at the ends thereof but when excess material also has to be removed in the region between the ends of the hollow molded article. Whether and to what extent that situation arises generally depends on the shape of the finished molded article. When considering hollow molded articles of a complicated configuration, for example a task for a motor vehicle, or the above-mentioned tubular ducts for motor vehicles, in the extreme case it may be necessary to squeeze off the finished hollow body a waste portion which extends therearound, with the result that that article also has a correspondingly long welded seam around it. The man skilled in the art is also aware of that kind of situation, as may be found for example from European patent specification No. 0 071 938.

It has been found that the operation of forming a welded seam on a preform or a hollow body to be produced therefrom, which in regard to at least one layer thereof comprises a foamed material, can give rise to problems in regard to the strength of such a seam. That is essentially to be attributed to the fact that, during the squeezing operation and the welding operation which takes place at the same time, the foamed layer or layers behave differently from walls of the preform, or layers making up such walls, which consist of non-foamed plastic material. In part, that is also due to the fact that the plastic material forming the foamed layer or layers, by virtue of the bubbles or pores present therein, presents a higher level of mobility in the sense of exhibiting a greater capacity for flow. As the squeezing operation and the operation of forming a welded seam are produced by two mutually oppositely disposed wall portions of a preform being pressed against each other between two squeeze edges which at the same time apply the pressure for forming the welded seam, it is inevitable that, in the course of the reduction in the spacing between the two squeeze edges, as they move towards each other, the plastic material between those edges begins to flow out of the area between the squeeze edges. To a certain extent that occurs irrespective of the nature of the individual layers in each squeezing and welding process. However, due to its greater capacity for flow, the material which forms a foamed layer is squeezed out of the gap between the squeeze edges, to a greater degree than a material forming a non-foamed layer, so that consequently, under otherwise identical conditions, less material in a foamed layer is available for forming the welded seam. That will necessarily result in a reduction in the quality of the welded seam, especially as the fact that the material forming a foamed layer escapes from the area of the squeeze edges to a greater degree than material forming a non-foamed layer also has an adverse effect on the build-up of a suitable pressure in the area of the welded seam, as the material which is to be found in the region between the squeeze edges presents a lower level of resistance to the movement of the two squeeze edges, by virtue of the greater capacity for flow of the foamed material.

The above-discussed process in accordance with U.S. patent specification No. 3 901 958 seeks to avoid such difficulties in that, at the moment at which excess material is squeezed off and at the same time the preform is subjected to the welding operation, the wall of the preform only consists of material which has not yet been foamed and which therefore does not have a greater capacity for flow, as just referred to above. However, the process of that U.S. patent specification still does not make it possible to produce a satisfactory welded seam for the reason that foaming of the material forming the foamable layer takes place only after the welded seam has been produced, with the consequence that the welded seam is weakened in a completely uncontrollable fashion and possibly even destroyed, by virtue of the foaming operation which inevitably also occurs in the region of the welded seam.

Having regard to the problems just discussed above, the invention further provides, in a preferred feature thereof, that the welded seam which is produced when excess material is squeezed off the preform is in the form of a web-like or flange portion in which mutually oppositely disposed wall portions of the preform are pressed against each other, and the at least one foamed layer, in the region of the flange portion, which is thus of a double-wall configuration, is subjected to a compacting effect due to the pressure applied in the formation thereof, so that the thickness thereof is reduced, whereby the thickness of the compacted layer or layers is less than the thickness of said layer or layers in the foamed condition.

In that form of the process according to the invention, in the step of forming the thickened welded seam which is of a generally flange-like configuration, the wall portions of the preform which form the welded seam are subjected to a pressing effect such that the at least one foamed layer is compressed to a density and thus thickness which approximately corresponds to the density and thickness of said layer or layers in the unfoamed condition. Accordingly, the wall portions forming the welded seam can be compressed such that the resulting flange portion is of a total thickness which corresponds to or is possibly also less than the thickness of all the layers at the initial density level and thus the sum of the initial thicknesses of the foamable layer or layers, in the non-foamed condition.

A welded seam formed by a flange portion in that way has the advantage that the surface areas, which form the welded seam, of the mutually oppositely disposed wall portions of the preform which are to be joined together by the welded seam, are greater and thus the specific loading in relation to surface area of the welded seam is lower, for example when the welded seam is subjected to a pulling loading transversely with respect to its longitudinal direction. On the other hand, during the operation of forming the welded seam the flange portion forms a kind of pocket which is open towards the interior of the hollow body. The effect of that pocket is that, in the operation of forming the welded seam, the pressing action of the two mutually oppositely disposed squeeze edge portions of the mold which move towards each other to form the welded seam do not cause the material involved in the welded seam and in particular that of the one or more foamed layers to flow away from the region of the welded seam to such an extent as in the case in conventionally formed welded seams which are not of a flange-like configuration as described above. In order to achieve the above-described effect, it may be desirable for the depth of the welded seam of a flange-like configuration, transversely with respect to its longitudinal direction, that is to say substantially parallel to the directions in which the layers of the preform or molded article are disposed, within the flange portion, to be such that it is greater than its width.

In many cases it will not be necessary for all the welded seams on a hollow body produced by the process of the invention to be in the form of a flange portion in the above-described manner. Thus, it is possible for the hollow body to have portions which are in any case removed as by cutting from the hollow body prior to use thereof. Such portions which generally represent wastage which is normally recycled do not call for the quality of the welded seam generally to be a matter of significance.

In another aspect of the present invention, there is also provided a hollow body of thermoplastic material produced by an extrusion blow molding process and including a wall comprising a plurality of layers of which one layer is at least partially foamed. The hollow body which is produced from a suitable preform has a welded seam closing the hollow body at regions thereof at which excess material has been squeezed off when the blow molding mold was closed. At least over a part of its extent, the welded seam is in the form of a web-like or flange portion which projects outwardly from the hollow body relative to the adjacent wall portions thereof. The width of the flange portion perpendicularly to its longitudinal direction is less than double the wall thickness of the preform in the foamed condition of the layer consisting of foamable material.

Further objects, features and advantages of the present invention will be apparent from the following description of preferred embodiments thereof.

BRIEF DESCRIPTION OF THE DRAWINGS

FIG. 2 shows the mold of FIG. 1 in a closed condition with a preform which is expanded by an increased internal pressure to provide the hollow body to be produced therefrom, FIG. 2a is a view in section on an enlarged scale of a part of the wall of the expanded preform, as indicated in the circle in FIG. 2, FIGS. 3a through 3d show sectional views on an enlarged scale of portions of walls of different preforms or finished articles produced therefrom.

DESCRIPTION OF THE PREFERRED EMBODIMENTS

Figure 1:
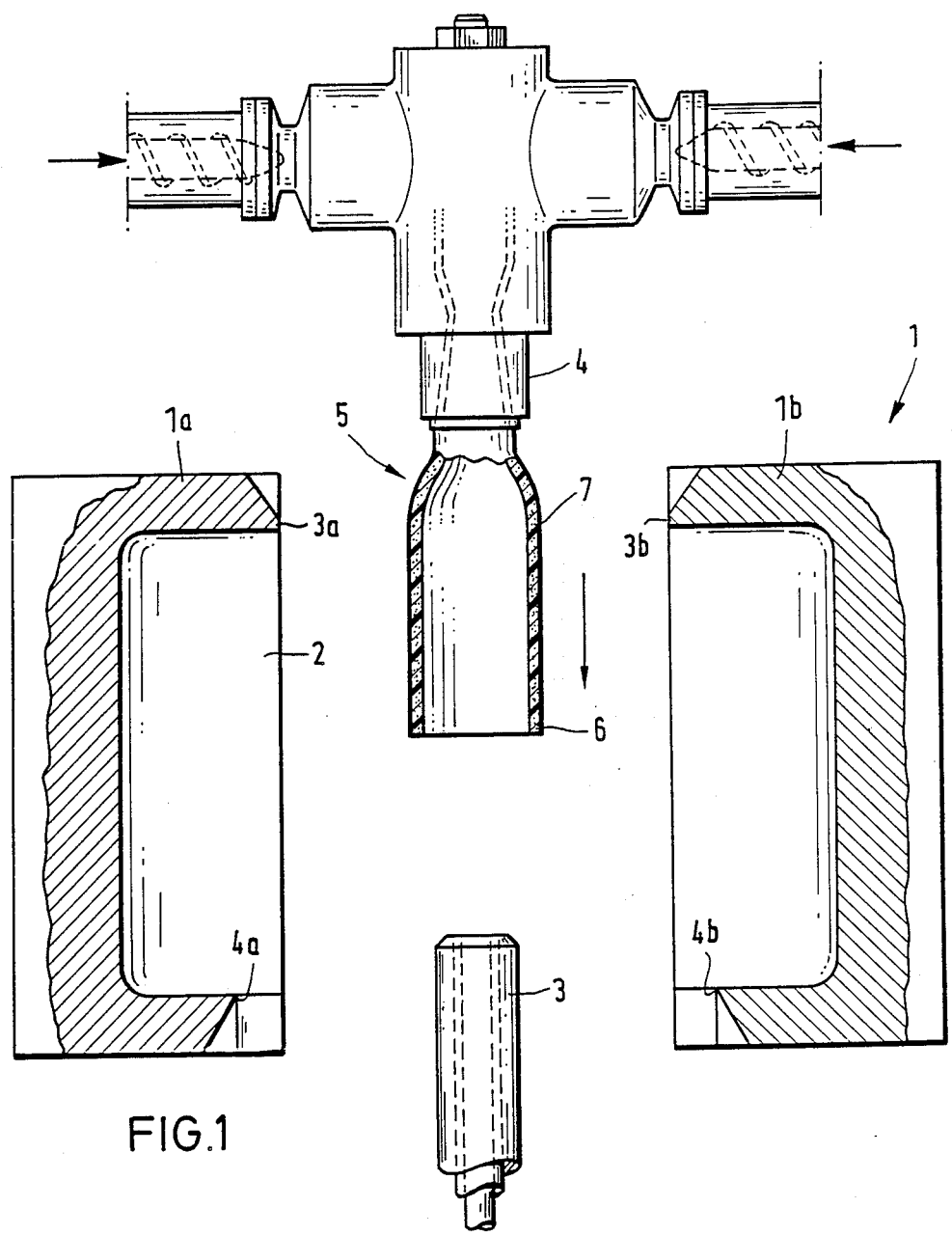
FIG. 1 is a diagrammatic view of a blow molding mold for the production of hollow bodies, in an open condition, with a partly extruded preform.

The process in accordance with the teachings of the present invention will first be described with reference to FIGS. 1, 2 and 2a showing apparatus for carrying out the process.

The illustrated apparatus comprises a blow molding mold 1 which is generally of a two-part construction. Operatively associated with the mold 1 is a blow molding mandrel 3 which projects into a mold cavity as indicated by reference numeral 2 in FIG. 1, from below the mold, into a position between the two mold portions 1a and 1b. The two mold portions 1a and 1b are provided with squeeze edges as indicated at 3a, 3b and 4a, 4b respectively. The two lower squeeze edges 4a and 4b serve to squeeze off the excess material as indicated at 20 in FIG. 2, which projects downwardly beyond the edges 4a, 4b.

The squeeze edges 3a and 3b which are disposed on the mold 1 in the upper portion thereof serve to squeeze excess material as indicated at 24 in FIG. 2, which projects upwardly from the mold cavity 2, off the portion of the preform 5 which is within the mold cavity 2.

The illustrated apparatus further comprises an extrusion head 4 of an extrusion apparatus provided with at least two extruders. When producing a preform of a tubular configuration, the extrusion head 4 has an annular outlet opening for the thermoplastic material.

The working cycle for producing a hollow body from a preform as indicated at 5 in FIG. 1 begins, with the mold 1 in the open condition shown in FIG. 1, with extrusion of the preform 5.

As used in this application, including the claims, the term "preform" shall mean a parison suitable for blow molding like the preform 5 indicated in FIG. 1. The wall of the preform 5 comprises first and second layers 6 and 7, which can be more clearly seen from FIG. 2a. The outer layer 6 comprises a non-foamable plastic material which is passed into the extrusion head 4 from one of the two extruders feeding same. The inner layer 7 comprises a foamable plastic material which is supplied to the extrusion head from the other extruder. Due to the pressure relief effect after the material comes out of the extrusion head 4, the material forming the inner layer 7 begins to foam as it leaves the extrusion head 4. Accordingly, at the latest after termination of the extrusion operation which is required for producing the preform 5, the finished preform 5 comprises a foamed layer 7 and a non-foamed layer 6. The multi-layer or laminate structure of the wall of the preform 5 can be clearly seen from FIG. 2a.

When the preform 5 has reached its required length, the mold 1 is closed around same. In the final phase of the closing movement the excess material portions 20 and 24 are squeezed off the preform, with the squeeze edges 4a and 4b co-operating with the blowing mandrel 3. In that situation, an opening which is caused by the presence of the mandrel 3 is still to be found on the expanded hollow body, as will be clearly seen from FIG. 2. In the regions adjacent the mandrel 3, further excess material may be squeezed off in the plane of separation of the two mold portions 1a and 1b, the plane of separation extending normal to the plane of the drawing in FIG. 2. In those regions, the preform 5 or the hollow body to be produced therefrom is closed by the formation of a welded seam which is not illustrated in FIG. 2. A similar procedure applies in regard to the squeezing effect produced by the squeeze edges 3a and 3b.

The blow molding operation is preferably begun just before the conclusion of the operation of closing the mold 1, in that compressed air which is supplied through the mandrel 3 causes the preform 5 to be expanded within the mold 1 and finally caused to bear against the wall defining the mold cavity 2 over the entire extent thereof, so that the preform 5 thus adopts the configuration defined by the mold cavity 2. The increased pressure produced within the preform causes both the outer layer 6 and the inner foamed layer 7 to be correspondingly displaced as the preform 5 adopts the configuration of the mold cavity 2. The inner layer 7 which, by virtue of being porous, is less stable in regard to its stretchability and its strength, is held and stabalised by the outer layer 6 as the bubbles or pores indicated at 8 in FIG. 2a in the layer 7, which are formed in the foaming operation, cannot escape to the exterior beyond the layer 6, in the operation of expanding the preform. In particular the openings which are formed at the inside surface of the hollow body produced in that way, due to the individual bubbles or pores to be found in that region being open to the surface of the hollow body, provide a sound-damping effect.

Figure 3A:
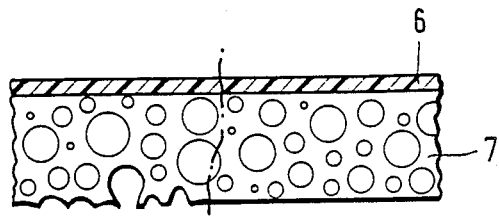
Figure 3B:
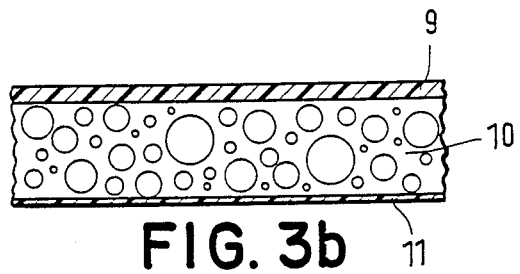
Figure 3C:
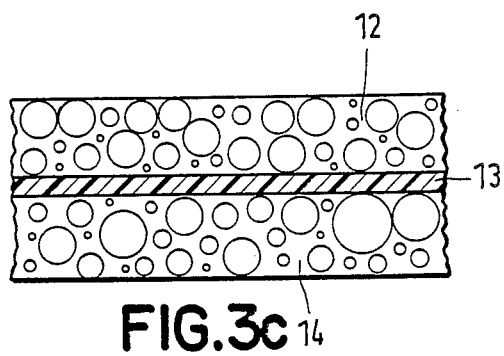
Figure 3D:
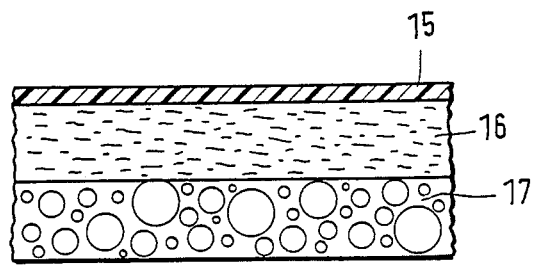

Reference will now be made to FIGS. 3a through 3d showing different forms of the wall portion of the preform or the hollow body produced therefrom in accordance with the process of the invention. The embodiment shown in FIG. 3a comprises a wall consisting of first and second layers, namely an inner layer 7 of foamed material and an outer layer 6 of non-foamable material. The constructions shown in FIGS. 3b through 3d involve walls which are of a three-layer nature. In the construction shown in FIG. 3b, the wall comprises a foamed layer 10 disposed between two non-foamable layers 9 and 11. The inner non-foamable layer 11 is thinner than the outer non-foamable layer 9. FIG. 3c shows a wall structure in which there are two formed layers 12 and 14 disposed on respective sides of a non-foamable layer 13. Finally, FIG. 3d shows a wall structure comprising a non-foamable layer 15 and a foamed layer 17, and between the layers 15 and 17, an additional layer 16 comprising a thermoplastic material with which inorganic filler material, for example glass fibers, is mixed.

Reference will again be made at this point to the construction shown in FIG. 3a in which the left-hand part thereof shows the foamed layer with foam bubbles or pores which are partially broken or burst open, while in the right-hand part in FIG. 3a the bubbles or pores are still closed. In practice, even when the foamed material comprises closed bubbles or cells, the surface of the foam layer will not always provide the smooth surface which is shown in the right-hand part in FIG. 3a.

The layers 12, 14 and 17 in FIGS. 3c and 3d respectively may be of a corresponding nature.

Figure 4:
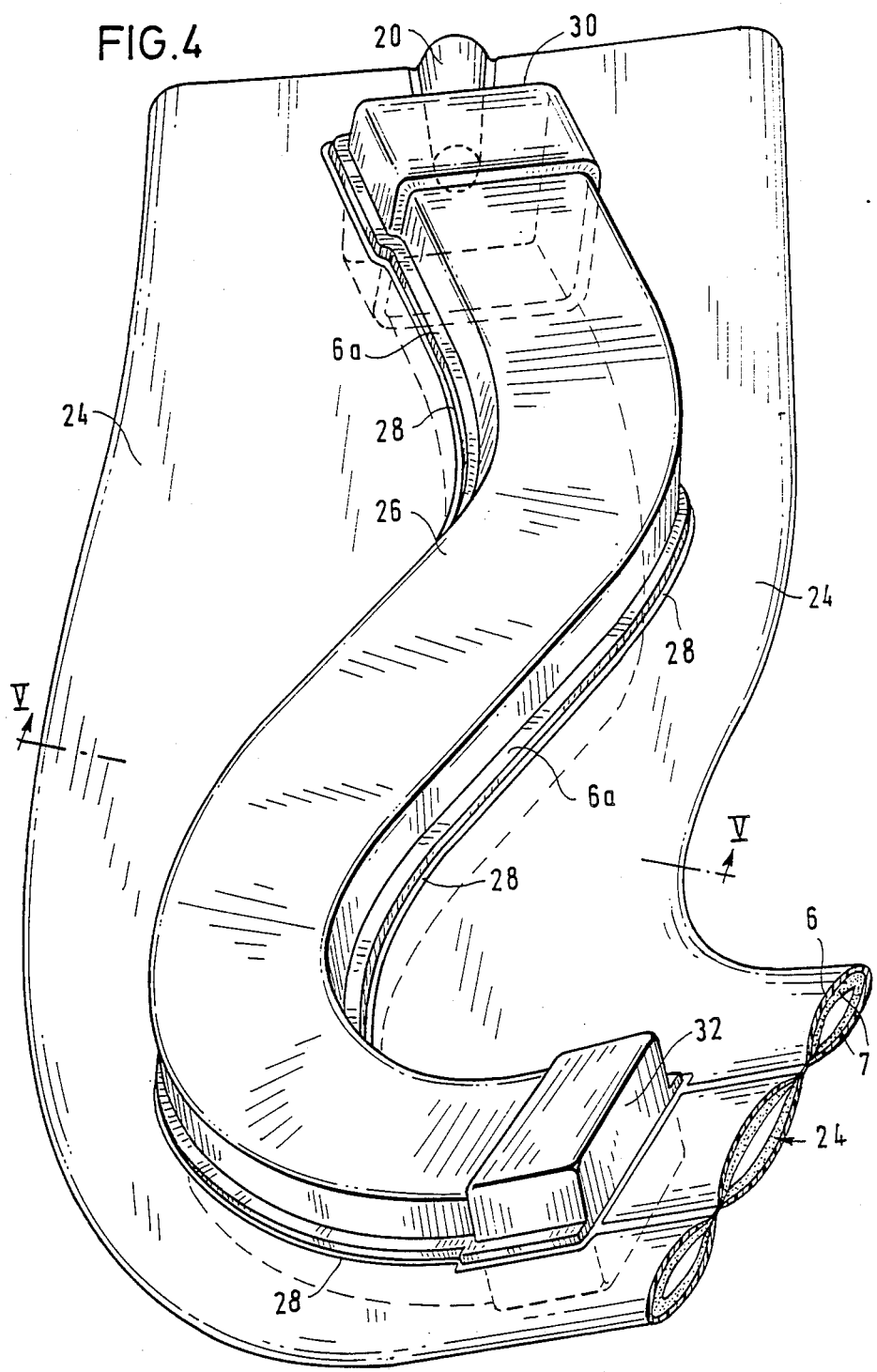
FIG. 4 is a perspective view of another hollow body produced by the process in accordance with the invention.

Reference will now be made to FIG. 4 showing a hollow body produced by means of the process in accordance with the present invention, in the form of a tubular conduit portion 26 as is used for example for providing ducts within a motor vehicle, for carrying for example air into the passenger compartment of a vehicle. The duct portion illustrated is of substantially rectangular cross-section. The shape thereof is essentially determined by the space available within the bodywork of the vehicle, through which the duct is to be laid. The duct portion shown in FIG. 4 still includes the excess material which was described above with reference to FIGS. 2 and 3 and which, upon closure of the two-part mold 1, had been squeezed off around the generally tubular preform 5. In that respect, the procedure is generally such that the excess material remains joined to the hollow body 26 by way of a thin film 28 which, after the hollow body 26 has been removed from the mold 1, is cut through in order to release the excess material from the hollow body 26. The thickness of the film 28 substantially depends on the force with which the mold 1 is closed and the nature of the squeeze edges as indicated at 3a, 3b and 4a, 4b in FIG. 1.

The duct portion 26 may be produced for example by its end which is the upper end in FIG. 4 being disposed in the mold 1 in FIGS. 1 and 2 in the lower part thereof, with the mandrel 3 projecting into the duct portion 26 or the preform therefor, through the end as indicated at 30 in FIG. 4. Accordingly the portion 20 is that part of the excess material which had been squeezed off the preform at the end thereof, between the mandrel 3 and the squeeze edges 4a and 4b. The portion 20 is adjoined by lateral squeezed-off regions in which the hollow body 26 is closed by a welded seam. The waste portion 24 which is to be found at the other end 32 of the duct portion 26 thus corresponds to the waste portion 24 in FIG. 2, which had been squeezed off the preform or the duct portion 26 to be produced therefrom, at the end thereof opposite to the mandrel 3, by the squeeze edges 3a and 3b provided in the upper portion of the mold 1, upon closing of the mold.

Figure 5:
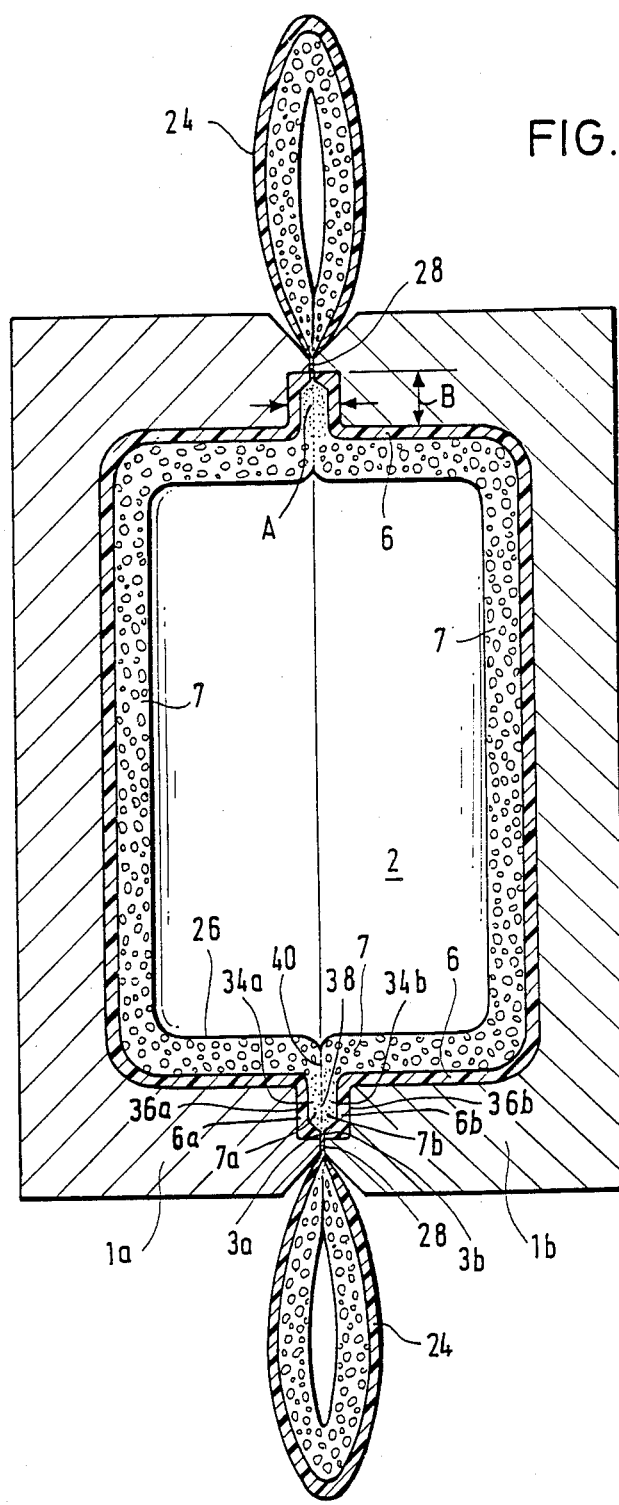
FIG. 5 is a view on an enlarged scale in section taken along line V—V in FIG. 4, showing additional parts of the blow molding mold.

It will be seen from FIG. 4 that the duct portion 26 is provided with a squeezed and welded seam which extends around the periphery thereof, apart from an opening in the region of the waste portion 20. The seam is shown in cross-section on a larger scale in FIG. 5. FIG. 5 also shows the mold portions 1a and 1b approximately at the stage in the process of the invention, which corresponds to that shown in FIG. 2, with the hollow body 26 already being expanded within the mold 1. Similarly to the embodiment shown in FIGS. 1 and 2, the wall of the hollow body in FIG. 5 comprises first and second layers, and inner layer 7 of foamed material and an outer layer 6 of non-foamable material.

In the region of the squeeze edges 34a and 3b which extend around the entire mold 1 or the mold portions 1a and 1b, the latter are provided with recesses 34a and 34b whose substantially mutually parallel walls 36a and 36b respectively define a cavity in the closed condition of the mold 1. The cavity defined by the walls 36a and 36b is open towards the interior of the mold cavity 2 and is delimited at its side remote from the mold cavity 2 by the squeeze edges 3a and 3b or the portions of the mold 1 carrying same.

Consequently, when the two mold portions 1a and 1b are closed around the preform 5, in the last phase of that closing movement the parts of the generally already pre-expanded preform 5, which project outwardly beyond the squeeze edges 3a and 3b and possibly the squeeze edges 4a and 4b, from the mold cavity 2, are removed from the preform in the mold cavity by the squeeze action of the squeeze edges 3a, 3b and 4a, 4b. That results in the waste portions 20 and 24 of excess material which in the embodiment shown in FIG. 3 extend around the expanded hollow body 26 on all sides thereof. The portions 20 and 24 generally remain joined to the expanded hollow body 26 by the above-mentioned film 28 so that the waste portions 20 and 24 have to be subsequently cut off or trimmed.

In the region of the cavity formed by the recessed 34a and 34b, the mutually oppositely disposed wall portions 6a, 6b; 7a, 7b of the preform or hollow body to be produced therefrom, which are pressed flat in the region of the squeeze edges and the recesses 34a, 34b, are pressed against each other and are welded to each other, thus producing a welded join or seam as indicated at 38 in FIG. 5, of a generally web-like or flange configuration, whereby the wall of the preform or the hollow body 26 is closed in the regions in which the waste portion 24 has been squeezed off. The width A of the flange portion 38, that is to say, the dimension thereof in a direction transverse with respect to its longitudinal direction, is less than the wall thickness of the preform in the non-foamed condition of the foamable layer 7. As the operation of forming the welded seam is effected by compression of the mutually oppositely disposed wall portions 6a, 6b and 7a, 7b of the preform 5 in the cavity formed by the recesses 34a and 34b after the layer 7 has been foamed, the two portions 7a and 7b of the foamed layer 7 are reduced in thickness within the cavity defined by the recesses 34a and 34b, such reduction in thickness being essentially caused by compacting of the foamed portions 7a and 7b of the layer 7 in the region of the cavity defined by the recesses 34a and 34b, with at the same time displacement of the air in the air bubbles or cells in the layer 7. Although the material forming the foamed layer 7 has a substantially greater capacity for flow than the same material when in the non-foamed condition, the tendency of the portions 7a and 7b of the formed layer 7 to escape towards the mold cavity 2 is reduced by virtue of the resistance to flow which is produced in the cavity defined by the recesses 34a and 34b, so that a sufficiently large part of the two portions 7a and 7b remains within the flange portion 38 as it is being formed, to present to the two mold portions 1a and 1b, in the region of the wall portions 36a and 36b thereof, in the course of the closing movement of the mold, a degree of resistance which is adequate to ensure that the pressure required for forming a good welded seam can be built up within the material in the cavity defined by the recesses 34a and 34b. Accordingly therefore that procedure results in the formation of the flange-like welded seam 38 in which the two portions 7a and 7b which were initially part of the foamed layer 7 of the preform have substantially returned to the condition in which they existed prior to foaming of the layer 7, so that the welded seam 38 comprises more or less homogeneous material which exhibits no residual foaming effect or only such an immaterial residual foaming effect that it does not adversely affect the strength of the welded seam.

It will be appreciated that the welded join also continues into the region indicated at 40 in FIG. 5, adjoining the flange portion 38 or the cavity defined by the recesses 34a and 34b, towards the mold cavity 2. In the region 40 the inner layer 7 is still in a foamed condition, even if perhaps to a reduced degree, so that the strength of the welded join which is formed at that location is possibly not such as to satisfy all the requirements that may be made in respect thereof, especially as in that location the pressure under which the two portions of the preform which are to be welded together are pressed against each other is substantially lower than the pressure within the cavity defined by the recesses 34a and 34b. However that is generally an immaterial consideration as the strength of the welded join or seam is guaranteed by virtue of the presence of the flange portion 78.

If possible the depth as indicated at B in FIG. 5 of the flange portion 38 should be not less than the width A in order thereby to give the necessary flow resistance to prevent in particular the material forming the foamed portions 7a and 7b from flowing out of the cavity defined by the recesses 34a and 34b in the course of the formation of the welded seam.

After removal of the waste material 20 and 24 which has been squeezed off the preform in the mold 1, it will also be necessary to remove the end surface 30 and 32 shown in FIG. 4, for example by means of a cutting operation, in order to open the ends of the duct portion for example to provide for connection thereof to a duct portion to be joined thereto. It goes without saying that it will not be necessary for the welded seam in the region of the ends of the duct portion or hollow body 26, which are in any case to be cut off after production thereof, to be formed in the above-described manner with reference to FIG. 5, as the strength of those weld seams is immaterial in regard to use of the end product.

It will be appreciated that the above-described process, apparatus and hollow body produced thereby have been set forth solely by way of example and illustration of the teaching of the present invention and that various other modifications and alterations may be made therein without thereby departing from the spirit and scope of the invention.

What is claimed is:

1. A hollow body of thermoplastic material produced by a co-extrusion blow molding process and comprising a wall provided by a plurality of layers of which at least one layer is at least partially foamed, wherein the hollow body which is produced from a co-extrusion preform has a welded seam for closing the hollow body at regions thereof at which excess material has been squeezed off the preform when the mold was closed, wherein said welded seam at least over part of the extent thereof is in the form of a flange portion which projects outwardly relative to the adjacent wall regions of the hollow body, and wherein the flange portion is of a thickness perpendicularly to its longitudinal extent, which is less than double the wall thickness of the preform in the foamed condition of said at least one layer of foamable material.

2. A hollow body as set forth in claim 1 wherein in the region of the welded seam the thickness of the foamed layer is less than the thickness of said layer when in an unfoamed condition.

3. A hollow body as set forth in claim 1 wherein said welded seam is of a total thickness which is less than the sum of the thicknesses of all layers at the initial density level and thus the initial thickness of said at least one foamed layer.

4. A hollow body as set forth in claim 1 wherein the depth of said welded seam flange portion transversely to its longitudinal extent is greater than its thickness.

5. A process for producing a hollow body having a wall which partially comprises foamed thermoplastic material, by an extrusion blow molding procedure, including: co-extruding a preform having at least first and second layers of which at least one layer comprises foamable plastic material; foaming said at least one layer of foamable material; disposing said preform in a blow molding mold, the mold comprising a plurality of mold parts and at least a portion of the extruded preform material being squeezed off the preform by squeeze edges on respective ones of said mold parts when the mold is closed on the preform; and expanding the preform in the mold until it bears against inside surfaces of the mold parts, using an internal increased pressure which is such that the at least one foamed layer is compressed only to an immaterial degree.

6. A process as set forth in claim 5 wherein said co-extruded preform is tubular.

7. A process as set forth in claim 5 wherein said at least one foamed layer is substantially entirely uncompressed under the effect of said pressure.

8. A process as set forth in claim 5 wherein a said layer of foamable material is arranged as an inner layer of said preform and a layer of non-foamable material is arranged as an outer layer thereof.

9. A process as set forth in claim 5 wherein a said layer of foamable material is disposed as an outer layer of the preform and a layer of non-foamable material is disposed as an inner layer thereof.

10. A process as set forth in claim 5 wherein a said layer of foamable material is disposed between two layers of non-foamable material.

11. A process as set forth in claim 10 wherein an inwardly disposed one of said layers of non-foamable material is thinner than the other, outwardly disposed, layer of non-foamable material.

12. A process as set forth in claim 5 wherein a layer of non-foamable material is disposed between an outer layer of foamable material and an inner layer of foamable material.

13. A process as set forth in claim 5 wherein disposed between an outer layer of non-foamable material and a said inner layer of foamable material is a layer of thermoplastic material mixed with inorganic filler material.

14. A process as set forth in claim 5 wherein said at least one layer of foamable material and at least one layer of non-foamable material are welded together.

15. A process as set forth in claim 5 wherein said at least one layer of foamable material and at least one layer of non-foamable material are joined together by a bonding agent.

16. A process as set forth in claim 5 wherein in the step of co-extruding the preform by means of a co-extrusion head the layers forming same are already joined together within the extrusion head.

17. A process as set forth in claim 5 wherein the preform includes at least one layer of non-foamable material which constitutes substantially from 5 to 20% of the total wall thickness thereof in the expanded condition.

18. A process as set forth in claim 17 wherein said at least one layer of non-foamable material constitutes substantially from 5 to 10% of said total wall thickness.

19. A process as set forth in claim 11 wherein said inwardly disposed layer of non-foamable material constitutes substantially from 5 to 10% of the total thickness in the expanded condition and said outwardly disposed layer of non-foamable material constitutes substantially from 5 to 20% of said total wall thickness.

20. A process as set forth in claim 5 wherein the step of expanding the preform in the mold is effected by an internal increased pressure of not more than about 1 bar.

21. A process as set forth in claim 5 wherein when the mold is closed, the preform is simultaneously closed by means of at least one welded seam in the form of a flange portion in which mutually oppositely disposed wall portions of the preform are pressed against each other, and said at least one foamed layer in the region of said flange portion is compacted by the pressure applied in the formation thereof so that the thickness thereof is reduced, whereby the thickness of the compacted at least one layer is less than the thickness of said at least one layer in the foamed condition.

22. A process as set forth in claim 21 wherein, in the step of forming said welded seam the wall portions of the preform forming same are pressed in such a way that said at least one foamed layer is compressed to a density and thus thickness substantially corresponding to the density and thickness of said at least one layer in the unfoamed condition.

23. A process as set forth in claim 5 wherein when the mold is closed, the preform is simultaneously closed by means of at least one welded seam in the form of a flange portion in which mutually oppositely disposed wall portions of the preform are pressed against each other, in such a way that the resulting double-wall flange portion is of a total thickness which is less than the sum of the thicknesses of all layers at the initial density level and thus the sum of the thicknesses of all layers in the non-foamed condition.

24. A process as set forth in claim 23 wherein the depth of said welded seam flange transversely to its longitudinal extent is greater than its said thickness.

25. A process for producing a hollow body formed by a wall means comprising a plurality of layers of which at least one said layer is of foamed thermoplastic material, comprising:

providing a generally tubular preform comprising a plurality of layers of which at least one is of foamable thermoplastic material;

foaming the foamable material of said at least one layer;

disposing the preform in a cavity of a blow molding mold enclosing the preform, the mold comprising a plurality of mold parts defining a mold cavity and at least a portion of the extruded preform material being squeezed off the preform by squeeze edges on respective ones of said mold parts when the mold is closed on the preform; and expanding the preform in the cavity in the mold enclosing the preform by introducing a fluid under pressure into the preform in the mold, thereby to cause at least substantially the whole of the outside surface of the preform to come to bear against the inside surface of said mold cavity, to mold the preform to the desired shape, the pressure produced within the preform by the fluid being controlled such that said at least one layer of foamed material remains at least substantially unchanged in thickness by the compression effect of the fluid pressure in the preform.

* * * * *